US010679179B2

(12) United States Patent
Trivelpiece et al.

(10) Patent No.: US 10,679,179 B2
(45) Date of Patent: Jun. 9, 2020

(54) SYSTEMS AND METHODS FOR AN IMPROVED TAG COUNTING PROCESS

(71) Applicants: Craig E. Trivelpiece, Mission Viejo, CA (US); Steve E. Trivelpiece, Rancho Santa Margarita, CA (US)

(72) Inventors: Craig E. Trivelpiece, Mission Viejo, CA (US); Steve E. Trivelpiece, Rancho Santa Margarita, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 371 days.

(21) Appl. No.: 15/493,355

(22) Filed: Apr. 21, 2017

(65) Prior Publication Data

US 2018/0308040 A1     Oct. 25, 2018

(51) Int. Cl.
*G06Q 10/08*     (2012.01)
*G06K 7/10*     (2006.01)
*G06K 17/00*     (2006.01)

(52) U.S. Cl.
CPC ....... *G06Q 10/087* (2013.01); *G06K 7/10009* (2013.01); *G06K 7/10386* (2013.01); *G06K 17/0022* (2013.01)

(58) Field of Classification Search
CPC ............. G06Q 10/087; G06K 7/10009; G06K 7/10386; G06K 17/0022

See application file for complete search history.

(56) References Cited

U.S. PATENT DOCUMENTS

| | | | | |
|---|---|---|---|---|
| 5,544,321 A * | 8/1996 | Theimer | ................. | G06F 21/35 709/226 |
| 6,297,737 B1 * | 10/2001 | Irvin | .................. | G08B 21/0227 340/3.51 |
| 6,609,106 B1 * | 8/2003 | Robertson | .............. | G06Q 10/02 705/14.36 |
| 6,611,811 B1 * | 8/2003 | Deaton | .................. | G06Q 20/20 705/14.38 |
| 6,694,366 B1 * | 2/2004 | Gernert | ............... | H04L 67/1095 709/218 |
| 7,010,501 B1 * | 3/2006 | Roslak | ................... | G06Q 20/20 705/23 |
| 7,270,262 B2 * | 9/2007 | Hartenstine | .......... | G06Q 10/087 235/375 |
| 7,420,465 B2 * | 9/2008 | Ritter | ..................... | G06Q 20/32 340/539.32 |
| 7,558,564 B2 * | 7/2009 | Wesby | .................. | G06Q 40/06 455/419 |

(Continued)

*Primary Examiner* — Ashford S Hayles
(74) *Attorney, Agent, or Firm* — Arent Fox LLP (57) ABSTRACT

Systems and methods for operating a tag reader. The methods comprise: performing tag read operations by the tag reader to read tags; processing first information received from the read tags to identify which tags are newly detected tags; adding entries for the newly detected tags in a local list stored in a local memory of the tag reader; communicating second information at least identifying the newly detected tags from the tag reader to a remote computing device; receiving, by the tag reader, feedback information generated by the remote computing device which specifies at least a count of entries added to a remote list stored in a remote datastore based on the second information; and selectively outputting a notification from the tag reader based on the value of the count.

20 Claims, 9 Drawing Sheets

(56) References Cited

U.S. PATENT DOCUMENTS

| | | | | |
|---|---|---|---|---|
| 7,627,502 B2* | 12/2009 | Cheng | G06Q 30/02 | 705/26.8 |
| 7,669,763 B2* | 3/2010 | Ernesti | G06Q 10/087 | 235/383 |
| 7,792,703 B1* | 9/2010 | Amidon | G06Q 30/02 | 705/26.1 |
| 7,797,204 B2* | 9/2010 | Balent | G06Q 30/0633 | 705/28 |
| 7,827,055 B1* | 11/2010 | Snodgrass | G06Q 30/02 | 705/14.73 |
| 7,991,652 B2* | 8/2011 | Chamberlain | G06Q 10/08 | 705/26.1 |
| 8,122,020 B1* | 2/2012 | Donsbach | G06Q 30/0631 | 707/732 |
| 9,736,628 B2* | 8/2017 | Jordan | H04W 4/02 | |
| 10,061,950 B1* | 8/2018 | Pesavento | G06K 7/10366 | |
| 2001/0021921 A1* | 9/2001 | Kan | G06Q 30/02 | 705/26.35 |
| 2001/0049636 A1* | 12/2001 | Hudda | G06O 30/06 | 705/26.1 |
| 2002/0032791 A1* | 3/2002 | Isherwood | G06F 16/9554 | 709/230 |
| 2002/0143564 A1* | 10/2002 | Webb | G06Q 10/087 | 705/305 |
| 2002/0161671 A1* | 10/2002 | Matsui | G06Q 30/02 | 705/26.62 |
| 2002/0167161 A1* | 11/2002 | Butland | G09F 3/00 | 283/72 |
| 2003/0050936 A1* | 3/2003 | Wainwright | G06Q 10/087 | |
| 2003/0083961 A1* | 5/2003 | Bezos | G06Q 30/02 | 705/26.8 |
| 2003/0204449 A1* | 10/2003 | Kotas | G06Q 10/087 | 707/781 |
| 2004/0049428 A1* | 3/2004 | Soehnlen | G06K 17/0022 | 705/25 |
| 2004/0118916 A1* | 6/2004 | He | G06K 7/0004 | 235/383 |
| 2004/0122746 A1* | 6/2004 | Charlier | G06Q 30/06 | 705/27.1 |
| 2004/0147270 A1* | 7/2004 | Petrovich | G06Q 20/04 | 455/456.3 |
| 2005/0035849 A1* | 2/2005 | Yizhack | G06K 7/0008 | 340/5.92 |
| 2005/0055451 A1* | 3/2005 | Tsuyama | G06F 16/51 | 709/229 |
| 2005/0137943 A1* | 6/2005 | Holzman | G06Q 10/087 | 705/28 |
| 2005/0148339 A1* | 7/2005 | Boman | G08B 13/1427 | 455/456.1 |
| 2005/0246238 A1* | 11/2005 | Dvorak | G06Q 30/06 | 705/26.9 |
| 2005/0253704 A1* | 11/2005 | Neuwirth | G06Q 20/203 | 340/539.13 |
| 2005/0256781 A1* | 11/2005 | Sands | G06Q 10/087 | 705/26.8 |
| 2006/0007003 A1* | 1/2006 | Yamagiwa | B62H 5/20 | 340/572.1 |
| 2006/0011716 A1* | 1/2006 | Perkowski | G06Q 30/02 | 235/375 |
| 2006/0054692 A1* | 3/2006 | Dickey | C08F 10/00 | 235/385 |
| 2006/0089897 A1* | 4/2006 | Maas | G06Q 10/08 | 705/37 |
| 2006/0136300 A1* | 6/2006 | Kopelman | G06Q 30/02 | 705/14.11 |
| 2006/0145850 A1* | 7/2006 | Krstulich | G08B 13/1427 | 340/572.1 |
| 2006/0202042 A1* | 9/2006 | Chu | G06K 17/0022 | 235/492 |
| 2006/0208859 A1* | 9/2006 | Hougen | G06K 7/0008 | 340/10.1 |
| 2006/0212357 A1* | 9/2006 | White | G06Q 20/20 | 705/18 |
| 2006/0238347 A1* | 10/2006 | Parkinson | G08B 13/1436 | 340/572.4 |
| 2006/0282304 A1* | 12/2006 | Bedard | G06Q 30/02 | 705/7.33 |
| 2007/0063817 A1* | 3/2007 | Cherry | G06K 17/00 | 340/10.1 |
| 2007/0095903 A1* | 5/2007 | Suenbuel | H04L 67/306 | 235/383 |
| 2007/0112649 A1* | 5/2007 | Schlabach | G06Q 10/087 | 705/28 |
| 2007/0152033 A1* | 7/2007 | Hind | G06Q 20/367 | 235/376 |
| 2007/0159330 A1* | 7/2007 | Chakraborty | G06F 21/56 | 340/572.1 |
| 2007/0250403 A1* | 10/2007 | Altschuler | G06Q 30/00 | 705/7.34 |
| 2007/0282716 A1* | 12/2007 | Branigan | G06Q 10/087 | 705/28 |
| 2007/0295808 A1* | 12/2007 | Tamarkin | G06Q 10/087 | 235/385 |
| 2008/0027814 A1* | 1/2008 | Kulakowski | G06Q 30/02 | 705/14.26 |
| 2008/0040240 A1* | 2/2008 | Covington | G06Q 30/00 | 705/26.8 |
| 2008/0062120 A1* | 3/2008 | Wheeler | G08B 25/016 | 345/156 |
| 2008/0065514 A1* | 3/2008 | Eaton | G06Q 10/087 | 705/26.3 |
| 2008/0086320 A1* | 4/2008 | Ballew | G06Q 10/06 | 705/342 |
| 2008/0086509 A1* | 4/2008 | Wallace | G06F 16/285 | |
| 2008/0114663 A1* | 5/2008 | Watkins | G06Q 30/06 | 705/26.1 |
| 2008/0115168 A1* | 5/2008 | Adwankar | H04N 7/17318 | 725/46 |
| 2008/0136642 A1* | 6/2008 | Wise | G08B 13/1427 | 340/572.1 |
| 2008/0147625 A1* | 6/2008 | Altounian | G06Q 10/087 | |
| 2008/0235108 A1* | 9/2008 | Kulakowski | G06Q 10/02 | 705/5 |
| 2008/0243915 A1* | 10/2008 | Shah | G06F 21/6227 | |
| 2008/0255968 A1* | 10/2008 | Heinrichs | G06Q 10/087 | 705/28 |
| 2009/0040021 A1* | 2/2009 | Seo | G06K 7/10049 | 340/10.1 |
| 2009/0048941 A1* | 2/2009 | Strassmann | G06Q 30/02 | 705/26.62 |
| 2009/0058653 A1* | 3/2009 | Geissler | G08B 13/2462 | 340/572.1 |
| 2009/0070273 A1* | 3/2009 | Moryto | G06Q 10/087 | 705/80 |
| 2009/0094260 A1* | 4/2009 | Cheng | G06Q 30/02 | |
| 2009/0138380 A1* | 5/2009 | Roseman | G06Q 30/0619 | 235/383 |
| 2009/0230191 A1* | 9/2009 | Saperstein | G06Q 10/08 | 235/385 |
| 2009/0242232 A1* | 10/2009 | Holcombe | G06Q 50/06 | 174/68.1 |
| 2009/0248549 A1* | 10/2009 | Breslau | G06Q 10/087 | 705/29 |
| 2009/0271275 A1* | 10/2009 | Regmi | G06Q 20/209 | 705/14.73 |
| 2009/0271284 A1* | 10/2009 | Arbib | G06Q 30/02 | 705/26.1 |
| 2009/0281877 A1* | 11/2009 | Bezos | G06Q 30/02 | 705/14.52 |
| 2010/0066497 A1* | 3/2010 | Lim | G06Q 10/08 | 340/10.1 |
| 2010/0095357 A1* | 4/2010 | Willis | G06F 21/6245 | 726/6 |
| 2010/0123562 A1* | 5/2010 | Hiramatu | G06Q 10/087 | 340/10.6 |
| 2010/0138304 A1* | 6/2010 | Boyarsky | G06Q 30/00 | 705/14.65 |

(56) References Cited

U.S. PATENT DOCUMENTS

| | | | | |
|---|---|---|---|---|
| 2010/0164715 A1* | 7/2010 | Buller | G08B 13/1427 | 340/539.32 |
| 2010/0225451 A1* | 9/2010 | Gladstone | G06Q 10/08 | 340/10.5 |
| 2011/0010270 A1* | 1/2011 | Hamilton, II | G06Q 30/02 | 705/26.63 |
| 2011/0068922 A1* | 3/2011 | Ross | G06Q 10/087 | 340/572.1 |
| 2011/0072132 A1* | 3/2011 | Shafer | G08B 13/2402 | 709/224 |
| 2011/0084807 A1* | 4/2011 | Logan | H04Q 9/00 | 340/10.1 |
| 2011/0202423 A1* | 8/2011 | Pratt | G06Q 30/02 | 705/26.7 |
| 2012/0009872 A1* | 1/2012 | Lane | G01K 1/024 | 455/41.1 |
| 2012/0092136 A1* | 4/2012 | Zhang | G06K 7/10049 | 340/10.2 |
| 2012/0161967 A1* | 6/2012 | Stern | G06Q 10/087 | 340/572.1 |
| 2012/0161968 A1* | 6/2012 | Bodapati | G01S 5/02 | 340/572.1 |
| 2012/0322380 A1* | 12/2012 | Nannarone | G08B 13/1427 | 455/41.2 |
| 2013/0033364 A1* | 2/2013 | Raz | G06K 19/0716 | 340/10.1 |
| 2013/0124463 A1* | 5/2013 | Lee | G06F 16/27 | 707/610 |
| 2013/0194077 A1* | 8/2013 | Vargas | G06K 7/10386 | 340/10.6 |
| 2013/0227653 A1* | 8/2013 | Choi | H04L 67/02 | 726/4 |
| 2013/0257614 A1* | 10/2013 | Perkins | G06Q 30/04 | 340/539.13 |
| 2013/0293352 A1* | 11/2013 | Vargas | G06Q 10/087 | 340/10.1 |
| 2014/0082099 A1* | 3/2014 | Burns | H04L 67/26 | 709/206 |
| 2014/0089243 A1* | 3/2014 | Oppenheimer | G06K 7/10009 | 706/46 |
| 2014/0213301 A1* | 7/2014 | Evans | H04W 4/029 | 455/456.3 |
| 2014/0231519 A1* | 8/2014 | Requist | G06K 7/10386 | 235/439 |
| 2014/0351098 A1* | 11/2014 | Shafer | G06Q 10/087 | 705/28 |
| 2015/0168533 A1* | 6/2015 | Chang | H04W 4/025 | 340/10.1 |
| 2015/0169916 A1* | 6/2015 | Hill | G08B 13/2462 | 340/10.1 |
| 2016/0140820 A1* | 5/2016 | Joseph | G06Q 10/0833 | 340/572.1 |
| 2016/0188930 A1* | 6/2016 | Zumsteg | G06K 7/10366 | 235/451 |
| 2016/0210547 A1* | 7/2016 | Dekeyser | G06K 7/065 | |
| 2016/0364681 A1* | 12/2016 | Andrus | G06Q 10/087 | |
| 2016/0371630 A1* | 12/2016 | Jetcheva | G06Q 10/087 | |
| 2017/0005826 A1* | 1/2017 | Youn | H04L 12/2825 | |
| 2017/0061175 A1* | 3/2017 | Lee | G06K 7/10366 | |
| 2017/0083857 A1* | 3/2017 | Barton | G06Q 10/0833 | |
| 2017/0311359 A1* | 10/2017 | Cho | H04W 76/14 | |

* cited by examiner

SYSTEMS AND METHODS FOR AN IMPROVED TAG COUNTING PROCESS

BACKGROUND

Statement of the Technical Field

The present disclosure relates generally to Radio Frequency Identification ("RFID") devices. More particularly, the present invention relates to implementing systems and methods for an improved tag counting process.

Description of the Related Art

Various methods have been used for reading and tracking RFID tags tied to inventory items in large stores and inventory areas. Cost of fixed infrastructure (such as mounted antennas) as well as the difficulty in providing full read coverage in constantly changing inventory locations has led to the use of handheld (and mobile) RFID readers for inventory cycle counting (actual read of inventory).

For small locations, a single person with a handheld reader can read hundreds of RFID tags per second and cover a store in a fairly short period of time. The problem comes in when large stores with millions of RFID tags deploys tens of people to try to capture an accurate inventory read and avoid multiple reads from the various users so they do not repeat scans in areas.

During cycle counting when the RFID readers are scanning an area, feedback is given to the users of the handheld RFID reader as (a) beeps for found RFID tags and (b) a visual counter showing an increasing total of RFID tag reads. This is often done as one beep per RFID tag found.

The current inventorying method is to download the entire database of known RFID tags into each handheld RFID reader as a list of RFID tag identifiers. As each RFID reader discovers RFID tags, it removes the corresponding RFID tag identifier from the list, and only beeps or counts the first time it finds a new RFID tag (i.e., an RFID tag having an RFID tag identifier which is not contained in the list). The RFID reader periodically sends information associated with new RFID tag finds to a remote server. The remote server tracks the cycle counting progress. One of the problems is that the RFID tag identifiers sent from each RFID reader are used to search through the data to find the corresponding records and update the status of those records. The performance of the database (which is being fed RFID tag identifiers from tens of RFID readers) causes delays in the system.

The above-described conventional method causes large delays at the start of cycle counting because all of the handheld RFID readers need to receive and process information for a million or more RFID tags. As the number of RFID tags in a store increases, the memory and capability of the RFID readers will be exceeded. This conventional method also causes major problems in Wi-Fi or communications traffic because the RFID tag read information uploaded by each RFID reader is distributed to each of the other RFID readers to prevent duplicate counting and beeping. This basically multiplies the bandwidth traffic by the number of RFID readers used in a cycle count. Additionally, it is difficult (a) to monitor progress during the cycle count, (b) to know when a count has reached a reasonable or useable level of completion (no count is 100% so the process must be stopped at a cost effective point), and (c) to correlate the timing and efficiency of counters (unless all devices are sufficiently time synced before the start of a cycle counting).

In some situations, certain RFID tags are identified as not to be counted during the cycle. These RFID tags are called exclusions. Exclusions are marked as non-counted tags in the lists downloaded into each RFID reader. The problem is that the size of the inventory (e.g., in millions) is exceeding the abilities of the RFID readers. The time to initially send the list of millions of RFID tag identifiers to the RFID readers is also a delay in the start of a tag read process. The volume of RFID tags sent to the cloud is large and the server is has difficulty handling the relatively large amount of data. As adoption and additional RFID tags are deployed, the situation will only get worse.

SUMMARY

The present invention concerns implementing systems and methods for operating a tag reader. The methods comprise: performing tag read operations by the tag reader to read tags; processing first information received from the read tags to identify which tags are newly detected tags; adding entries for the newly detected tags in a local list stored in a local memory of the tag reader; communicating second information at least identifying the newly detected tags from the tag reader to a remote computing device; receiving, by the tag reader, feedback information generated by the remote computing device which specifies at least a count of entries added to a remote list stored in a remote datastore based on the second information; and selectively outputting a notification from the tag reader based on the value of the count.

In some scenarios, the second information is communicated from the tag reader continuously or at every pre-defined interval of time. The entries are added to the remote list based additionally on third information obtained from at least one other tag reader. At least a first portion of the local list is cleared prior to when the tag read operations are performed by the tag reader. A second portion of the local list includes exclusion information identifying tags that are not to be counted during a tag counting cycle. An entry is removed from the local list for at least one tag associated with an oldest tag read. The second information further specifies at least one of a unique reader identifier and a location of the tag reader. The feedback information further specifies at least one of a percentage of cycle completion, a user efficiency, and an area of a facility in which tag reads still need to be performed. The notification is selectively output from the tag reader only when the value is a non-zero value. The notification includes, but is not limited to: at least one beep having a variable volume or variable duration that correspondingly increases and decreases with changes in the value; and/or a plurality of beeps of a number defined by the value.

BRIEF DESCRIPTION OF THE DRAWINGS

Embodiments will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Figure 1A:
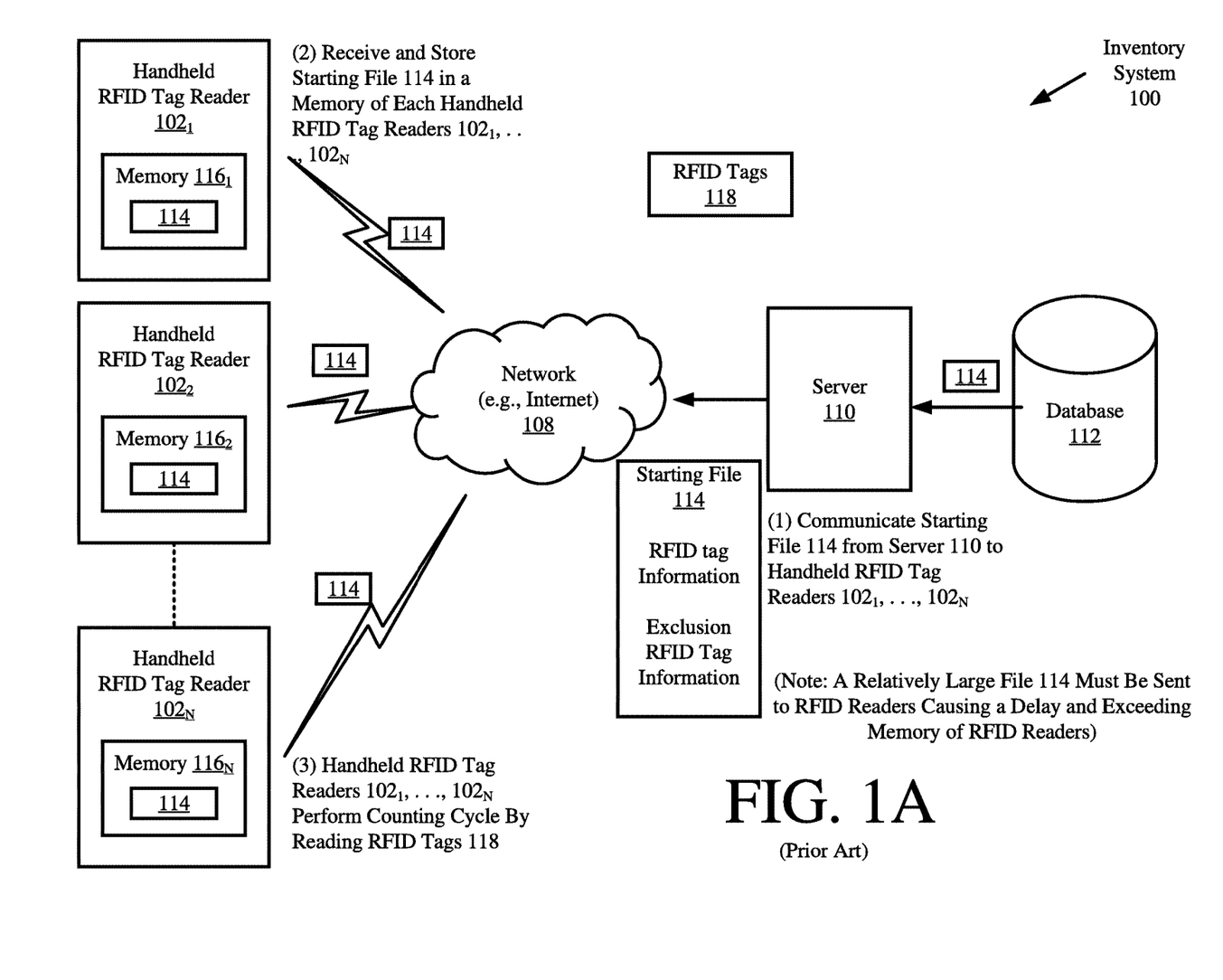
FIGS. 1A-1B (collectively referred to as "FIG. 1") provide an illustration of a conventional inventory system.
Figure 1B:
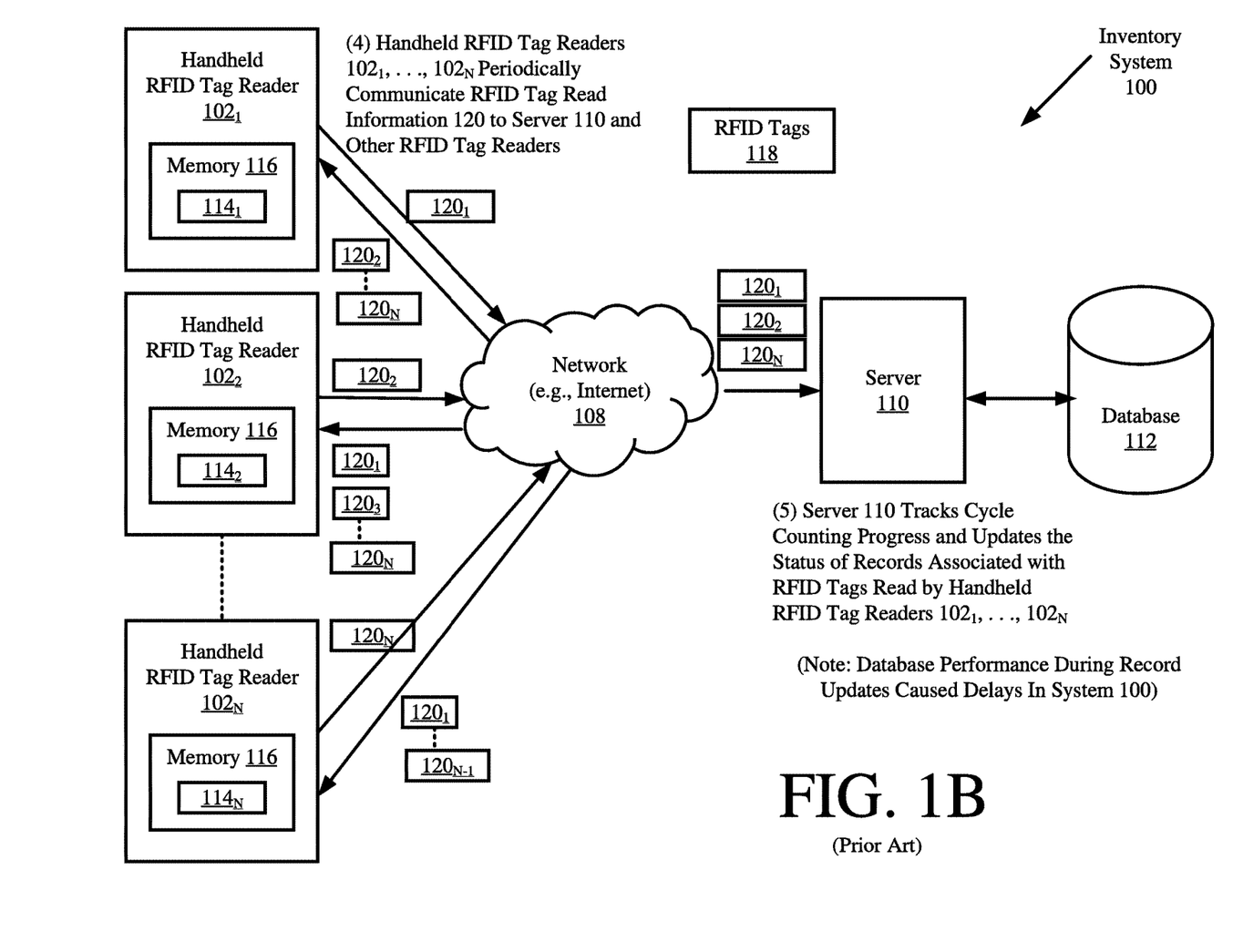

Referring now to FIGS. 1A-1B, there are provided illustrations that are useful for understanding how a conventional inventory system 100 operates. During operation, the server 110 accesses a database 112 to obtain a starting file 114 therefrom. The starting file 114 is then communicated from the server 110 to handheld RFID readers $102_1$, $102_2$, ..., $102_N$ via a network 108 (e.g., the Internet). Notably, the starting file 114 is relatively large. As such, the transfer thereof from the server to the handheld RFID readers $102_1$, $102_2$, ..., $102_N$ causes an undesirable delay at the start of a cycle counting process. Also, the file size might exceed the memory limits of the handheld RFID readers $102_1$, $102_2$, ..., $102_N$.

Upon receipt of the starting file 114, the handheld RFID readers $102_1$, $102_2$, ..., $102_N$ store the same in their local memories $116_1$, $116_2$, ..., $116_N$. The starting file 114 comprises RFID tag information for RFID tags that are to be counted and exclusion RFID tag information for RFID tags that are not to be counted. In some scenarios, the RFID tag information includes a list of RFID tag identifiers identifying RFID tags deployed in the inventory system 100 that should be counted during a given cycle of the counting process. The exclusion RFID tag information includes a list of RFID tag identifiers that should not be counted during a given cycle of the counting process.

Next, the handheld RFID readers $102_1$, $102_2$, ..., $102_N$ perform tag counting by reading RFID tags 118 and tracking which RFID tags have been read. As part of this tag counting process, each handheld RFID reader $102_1$, $102_2$, ..., $102_N$ removes RFID tag identifiers for detected RFID tags from the RFID tag information of the locally stored starting file 114 and issues at least one output (e.g., a beep and/or a visual counter) upon a detection of each new RFID tag (or removal of an RFID tag identifier from the locally stored starting file). Also, each handheld RFID reader $102_1$, $102_2$, ..., $102_N$ periodically sends RFID tag information $120_1$, $120_2$, ..., $120_N$ to the server 110 and other handheld RFID readers. This RFID tag information $120_1$, $120_2$, ..., $120_N$ includes RFID tag identifiers for RFID tags (newly and previously detected) which have been detected by the respective handheld RFID reader. This communication causes undesirable bandwidth utilization in the system 100 since the RFID tag information must be distributed to all other RFID readers for purposes of preventing counting duplication thereby.

Upon receipt of the RFID tag information, the server 110 performs operations to update records associated with the RFID tags identified therein. Since the server 110 receives RFID tag information from N readers (e.g., ≥10 readers), undesirable delays are caused in the record updating process.

The present solution cures the above identified drawbacks of the conventional inventory system 100. In this regard, each handheld RFID reader of the present solution starts with an empty datastore for immediate response (i.e., the starting file 114 no longer needs to be downloaded at the start of a cycle counting process) and maintains the local datastore in a manner that prevents duplicate beeps thereby upon the detection of RFID tags. Also, each handheld RFID reader sends information for newly detected RFID tags to the sever at a relatively rapid pace (e.g., continuously via streaming, or every 0.5-1.0 second). Notably, this information is not sent to other handheld RFID tag readers. The server then inserts records for the newly detected RFID tags as a batch into the database 112. Only globally unique RFID tags will insert (duplicates reject off of Electronic Product Code ("EPC") primary key) so the server will very quickly return a count of RFID tag identifiers (or a count of datastore entries) inserted into the remote database 112. The server only returns this count of inserted RFID tag identifiers (or a count of datastore entries) to the respective handheld RFID reader. The respective handheld RFID reader now outputs a notification (e.g., beeps) based upon the remoted generated count returned from the server 210, and not based on locally generated information specifying the number of newly detected RFID tags (as is done in the conventional system 100). This prevents duplicate beeps between handheld RFID readers.

Notably, in the present solution, the handheld RFID readers do not need to be provided with the other RFID tag information from the other RFID readers since the server notifies them as to how many globally unique RFID tags were found. This vastly reduces traffic in the system since the RFID tag information identifying RFID tags detected by each handheld RFID reader does not need to be distributed in real-time to the many other handheld RFID readers.

If there is no server connectivity for one (1.0) second (or a longer period of time), then the handheld RFID readers output notifications (e.g., beeps) based on the locally generated information indicating one or more occurrences of a newly detected RFID tags. This does not affect global counts once the sever is back online. Worst case is there are some extra notification outputs (e.g., beeps). This really only even matters if there would have been zero (0) new RFID tags in view. Otherwise, the handheld RFID readers would legitimately beep anyway so there is no difference in feedback to the users.

Cycle counting does not need instantaneous and specific beeping (e.g., a Geiger counter function), so the granularity and delay of the present solution does not affect cycle counting. Giving feedback to the users every M seconds based upon server feedback is sufficient, where M is a decimal (e.g., 0.5) or an integer (e.g., 1).

Figure 2:
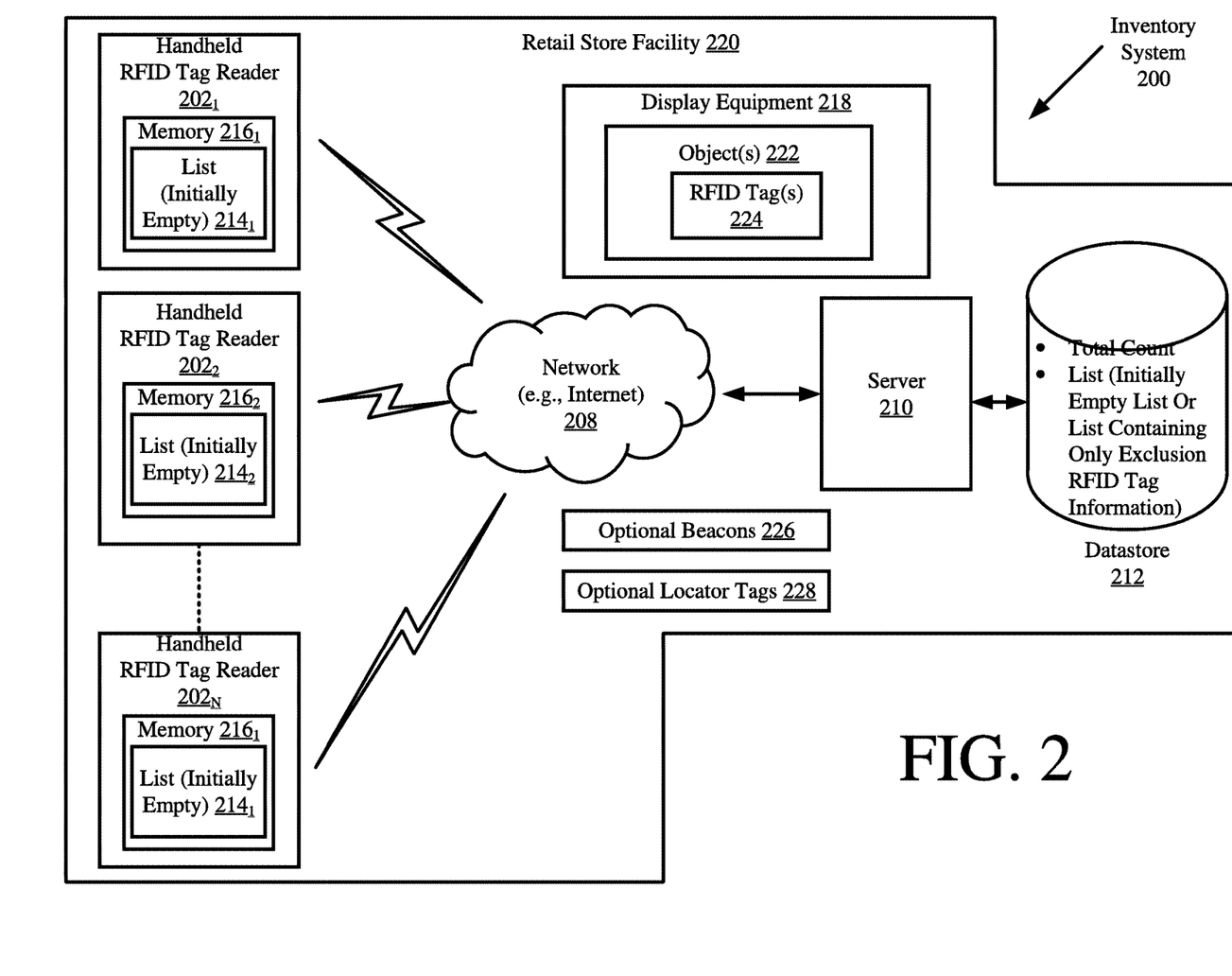
FIG. 2 is an illustration of an exemplary inventory system implementing the present solution.

Referring now to FIG. 2, there is provided an illustration of an exemplary inventory system 200 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

Notably, the present solution is described herein in relation to handheld RFID tag readers. However, the present solution is not limited in this regard. For example, the present solution can alternatively or additionally be implemented by robotic devices (e.g., autonomous RFID readers, drones, etc.).

System 200 is generally configured to provide an improved cycle counting process for RFID tags 224. As shown in FIG. 2, system 200 comprises a Retail Store Facility ("RSF") 220 in which display equipment 218 is disposed. The display equipment is provided for displaying objects (or items) 222 to customers of the retail store. The display equipment can include, but is not limited to, shelves, article display cabinets, promotional displays, fixtures and/or equipment securing areas of the RSF 220. The RSF can also include emergency equipment (not shown), checkout counters and an EAS system (not shown). Emergency equipment, checkout counters, and EAS systems are well known in the art, and therefore will not be described herein.

RFID tags 224 are respectively coupled to the objects (or items) 222 for inventorying and/or location tracking purposes. The RFID tags are described herein as comprising single-technology tags that are only RFID enabled. The present solution is not limited in this regard. The RFID tags can alternatively or additionally comprise dual-technology tags that have both EAS and RFID capabilities.

At various times, it is desirable to perform counts of the RFID tags 224 for inventory purposes. This RFID tag counting is achieved using at least one handheld RFID tag reader $202_1, 202_2, \ldots, 202_N$. The RFID tag counting process can begin immediately by the handheld RFID tag reader $202_1, 202_2, \ldots, 202_N$ provided that they know the total count and/or exclusion count for the cycle. Notably, there is no large list download to each handheld RFID tag reader at the start of the counting cycle as is done in the conventional system described above.

Each handheld RFID tag reader $202_1, 202_2, \ldots, 202_N$ is generally configured to read RFID tags 224. During the RFID tag reading process, each handheld RFID tag reader $202_1, 202_2, \ldots, 202_N$ maintains its own list $214_1, 214_2, \ldots, 214_N$ of previously read RFID tags. This list is initially cleared or empty (optionally except for exclusion RFID tag information). The list can include, but is not limited to, a First-In-First-Out ("FIFO") list in which the RFID tag information associated with the oldest RFID tag reads is discarded once the list becomes full. In some scenarios, 700,000 entries is sufficient to guarantee no discards for at least an hour which covers a large physical area so duplicates are unlikely from purging old tags.

The handheld RFID tag readers $202_1, 202_2, \ldots, 202_N$ also communicate RFID tag read information (e.g., EPCs) and/or cycle counting information to and from a remote server 210. Server 210 is generally configured to monitor and track the progress of the RFID tag counting process and/or user efficiency. In this regard, the server 210 reads and writes data from datastore 212. Datastore comprises, but is not limited to, a Structured Query Language ("SQL") database and/or a NoSQL database. Real-time status of the progress of the cycle counting is possible by monitoring a total number of RFID tags found against an expected number of RFID tags taking into account any exclusions. User efficiency can be tracked by having transmissions to the server include unique reader identifiers for the handheld RFID tag readers (e.g., Media Access Control ("MAC") addresses). Transmission delays from the handheld RFID readers due to loss of network connectivity can be handled by keeping track of the time delay and have this subtracted from the time in the server.

In some scenarios, the RFID tag counting is achieved using a single zone theory. Alternatively, the RFID tag counting is achieved using a multi-zone theory, i.e., the present solution supports multiple simultaneous zones to which the RFID tag readers are respectively assigned. Lists containing different exclusion RFID tag information are stored in the database 212 so as to be respectively associated with the zones, i.e., an exclusion list for each zone is stored in the datastore. Zone level tracking of cycle count efficiency can be tracked by the server and displayed to the user via the RFID tag reader. This gives selective feedback to the user without having to send and receive large amounts of data for the RFID tag readers.

In some zone based scenarios, beacons 226 and/or locator tags 228 can be disposed in the RSF 220 to provide location information to the RFID tag readers so that their movements can be tracked by the sever 210. The server 210 can use this location information to track coverage by zone and track zones of unread tags. This can also be used to validate that the RFID tag readers have been used in each zone. The handheld RFID tag readers $202_1, 202_2, \ldots, 202_N$ could add the current zone to the RFID tag information as it is sent to the server 210, thereby allowing the locations of the RFID tags to be tracked. The handheld RFID tag readers $202_1$, $202_2$, ..., $202_N$ can be directed to specific zones and employees searching for inventory can have a general location to begin their searching for a particular object (or item).

Notably, the scalability of system 200 is only limited by the size of the database 212 which can be made successively larger. Traffic from the handheld RFID tag readers $202_1$, $202_2$, ..., $202_N$ to the server 210 is minimized in system 200 by limiting the same to include information relating to the new RFID tag detections thereby. There is no overhead in system 200 to distribute RFID tag read data to all other handheld RFID readers involved in the inventorying process. In order to minimize the system's transmission overhead, the new RFID tag information is streamed or batched at relatively short intervals (e.g., 0.5 or 1.0 second intervals). The interval length is selected so that appropriate feedback is provided to the user about the tag counting process (e.g., new RFID tag detections and progress of the tag counting process). The RFID tag information may be compressed prior to communication to the server 210.

As with many communication systems, system 200 may experience technical difficulties with communications to and from network nodes. In this case, the system is in an off-line state. The handheld RFID tag readers can still provide feedback to the user even though they are not receiving count data from the server 210. Each handheld RFID tag reader will synchronize with the server 210 when the system no longer experiences technical difficulties (or is in an on-line state). During the synchronization period, the handheld RFID tag reader sends the new RFID tag information which has been held during the off-line state, and ignores feedback count information from the server (because the time for feedback has already passed). Optionally, some level of optimization could be done by sending RFID tag read data from adjacent areas or the same floor to adjacent handheld RFID tag readers to prevent beeping when the system is in its off-line state or when the response is too slow.

In order to maintain consistent feedback to the user, the timing of the feedback may be locally managed by the RFID tag readers regardless of the feedback from the server. If new RFID tag information is sent from the RFID tag readers every M seconds (e.g., 0.5-1.0 seconds), then the feedback is given to the user every M seconds (e.g., 0.5-1.0 seconds). If the server 210 has responded in time, then the feedback corresponds with the results from the server. If the time to respond was missed, then the RFID tag reader responds to the user based upon the count of new locally found tags. This produces no negative impact other than the user thinks (s)he has found more globally unique RFID tags than (s)he has actually found.

During operation, two or more handheld RFID tag readers may detect the same RFID tag and send corresponding information to the server. In this case, the sever is operative to detect duplicate detections of the same RFID tag and insert a single entry for this RFID tag in the list/records of the datastore 212. For faster performance, the EPC codes of the RFID tags can be used as the datastore index so that an insert of the new RFID tags can be done and the datastore will return the number of inserts (new RFID tags) without having to do specific searches of a large datastore for duplicates or to modify tag records. Time of insert can be automatically generated at the datastore insert so that this does not need to be done at the handheld RFID tag readers and transmitted to the server. This eliminates the need for synchronizing the clocks in the handheld RFID readers.

The present solution not limited to the system architecture shown in FIG. 2. For example, two or more networks, servers and datastores can be used to implement the present solution as opposed to only one thereof as shown in FIG. 2.

Figure 3:
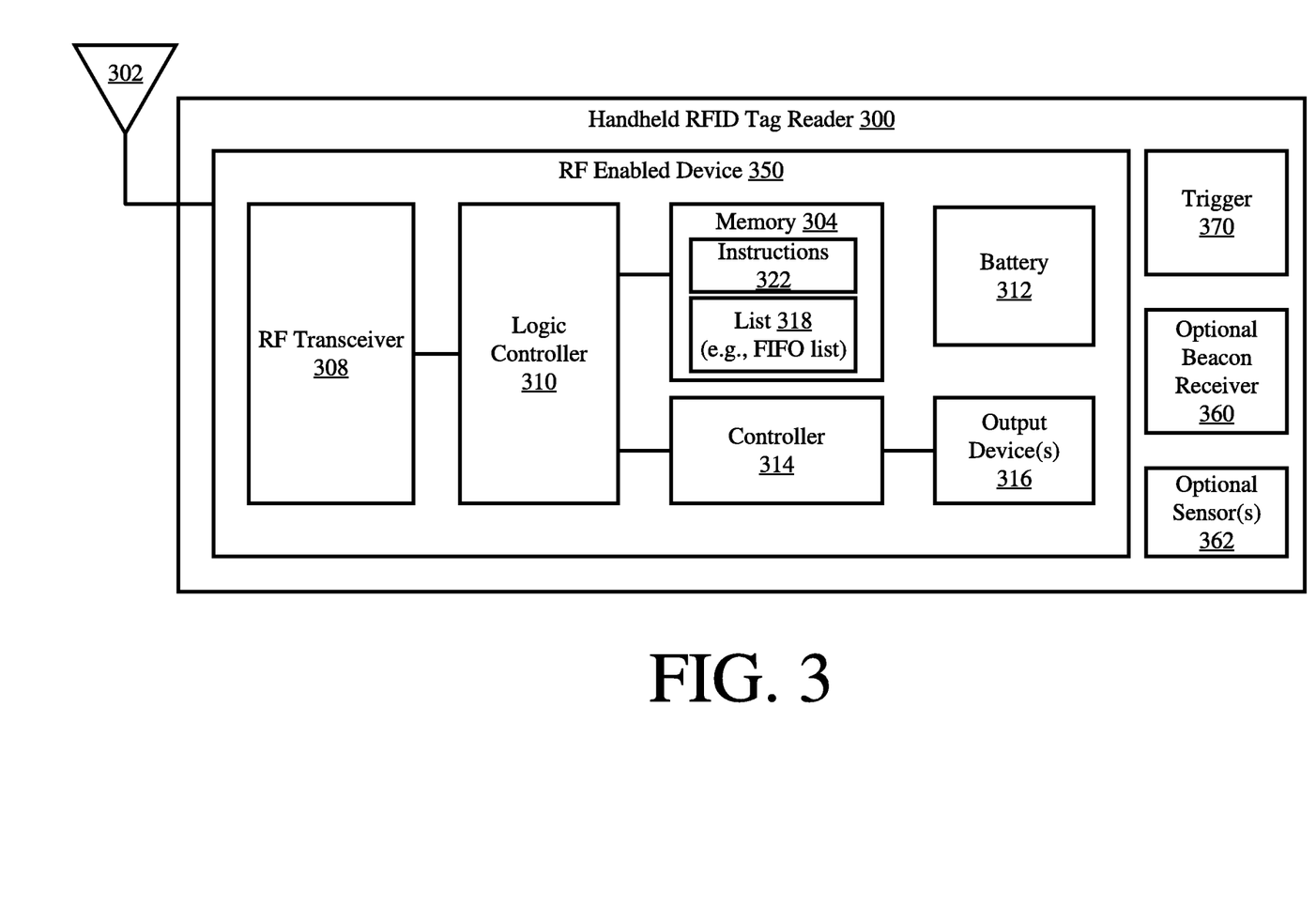
FIG. 3 is an illustration of an exemplary architecture for a handheld RFID tag reader.

Referring now to FIG. 3, there is provided a detailed block diagram of an exemplary architecture for a handheld RFID tag reader 300. Handheld RFID tag readers $202_1$, $202_2$, ..., $202_N$ of FIG. 2 are the same as or similar to handheld RFID tag reader 300. As such, the discussion of handheld RFID tag reader 300 is sufficient for understanding handheld RFID tag readers $202_1$, $202_2$, ..., $202_N$.

Handheld RFID tag reader 300 may include more or less components that that shown in FIG. 3. However, the components shown are sufficient to disclose an illustrative embodiment implementing the present solution. Some or all of the components of the handheld RFID tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an embodiment of a representative handheld RFID tag reader 300 configured to facilitate an improved cycle counting process for RFID tags (e.g., RFID tags 224 of FIG. 2). In this regard, the handheld RFID tag reader 300 comprises an RF enabled device 350 for allowing data to be exchanged with an external device (e.g., RFID tags 224 of FIG. 2) via RF technology. The components 304-316 shown in FIG. 3 may be collectively referred to herein as the RF enabled device 350, and include a power source 312 (e.g., a battery).

The RF enabled device 350 comprises an antenna 302 for allowing data to be exchanged with the external device via RF technology (e.g., RFID technology or other RF based technology). The external device may comprise RFID tags 224 of FIG. 2. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RFID transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to identify which RFID tags of a plurality of RFID tags has been read thereby and/or to determine a location of the handheld RFID tag reader 300 within a facility (e.g., RSF 220 of FIG. 2). Accordingly, the logic controller 310 can store the extracted information in local memory 304, and execute algorithms using the extracted information. For example, the logic controller 310 can: clear or empty a local list 318 (e.g., a FIFO list) at the start or end of a counting cycle; populate the local list 318 with RFID tag identifiers (e.g., EPC codes) contained in the extracted information; discard entries in the local list 318 based on the time of the corresponding RFID tag reads; maintain a count of how many RFID tags have been read thereby; identify and ignore information associated with duplicate RFID tag reads; log information indicating that duplicate reads of a given RFID tag has occurred; cause information relating to RFID tag reads to be communicated to a remote server (e.g., server 210 of FIG. 2); receive feedback information from the remote server (e.g., server 210 of FIG. 2) indicating the number of RFID tag identifiers (associated with RFID tags recently read thereby) that have been inserted into a remote list stored in a datastore (e.g., datastore 212 of FIG. 2) and/or a percentage of counting cycle completion; optionally generate a timestamp for each RFID tag identifier entry into the local list 318; optionally store the timestamps in the local list 318 so as to be respectively associated with the list entries; cause an audible notification (e.g., a beep) and/or visual notification (e.g., a total count indicator or cycle completion indicator) to be output from the handheld RFID tag reader based on the contents of count information received from the remote server and/or based on locally generated information indicating a number of RFID tags which have been detected thereby; optionally perform operations to determine the location of the RFID tags within the facility; and/or optionally cause location information for the RFID tags to be sent to the remote server. Other functions of the logic controller 310 will become evident as the discussion progresses.

In some scenarios, the audible notification is output when the count information contains a non-zero numerical value. For example, if the count information contains a numerical value of zero, then the handheld RFID reader does not output any audible or count related update to the user (as if no RFID tags were found). In contrast, if the count information contains a numerical value of an integer greater than one, then the handheld RFID tag reader provides audible feedback to the user in proportion to the number of new RFID tags detected. The handheld RFID tag reader also updates its internal counter accordingly. This gives the user feedback about how many RFID tags may still be in the area of scanning. As an optimization, user feedback could be grouped into small, medium and large feedback sounds or visual indicators. This reduces the overhead of the handheld RFID reader for giving feedback on each new RFID tag detected.

Methods for determining the locations of RFID tags in a facility (e.g., facility 220 of FIG. 2) are well known in the art. Any known method for determining such locations can be used herein without limitation. For example, the present solution can employ beacons (e.g., beacons 226 of FIG. 2) and/or locator tags (e.g., locator tags 228 of FIG. 2) with known locations for this purpose. The locator tags can include, but are not limited to, RFID tags.

Notably, memory 304 may be a volatile memory and/or a non-volatile memory. For example, the memory 304 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 304 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate an improved RFID tag counting process. Other functions of the RF enabled device 350 will become apparent as the discussion progresses.

The handheld RFID tag reader 300 may also comprise an optional beacon receiver 360. The beacon receiver 360 is generally configured to: receive a command signal from the RF enabled device 350 to obtain unique IDs from beacons; send signals to the beacons (e.g., beacons 226 of FIG. 2) requesting that unique IDs be transmitted therefrom; receive signals transmitted from the beacons; parse unique IDs from the received signals; and communicate the unique IDs to the RF enabled device 350. The command signal can be generated by and sent from the RF enabled device 350 in response to an operator's depression of a trigger 370.

The handheld RFID tag reader 300 may further comprise an optional proximity sensor 362 (e.g., an acoustic sensor or infrared sensor). The proximity sensor 362 detects the distance from the handheld RFID tag reader 300 to the RFID tags being read (e.g., RFID tags 224 of FIG. 2). A distance threshold value can be applied to trigger the location mode. The distance can be used to adjust the read power of the handheld reader and/or to compute more precise RFID tag locations.

Figure 4:
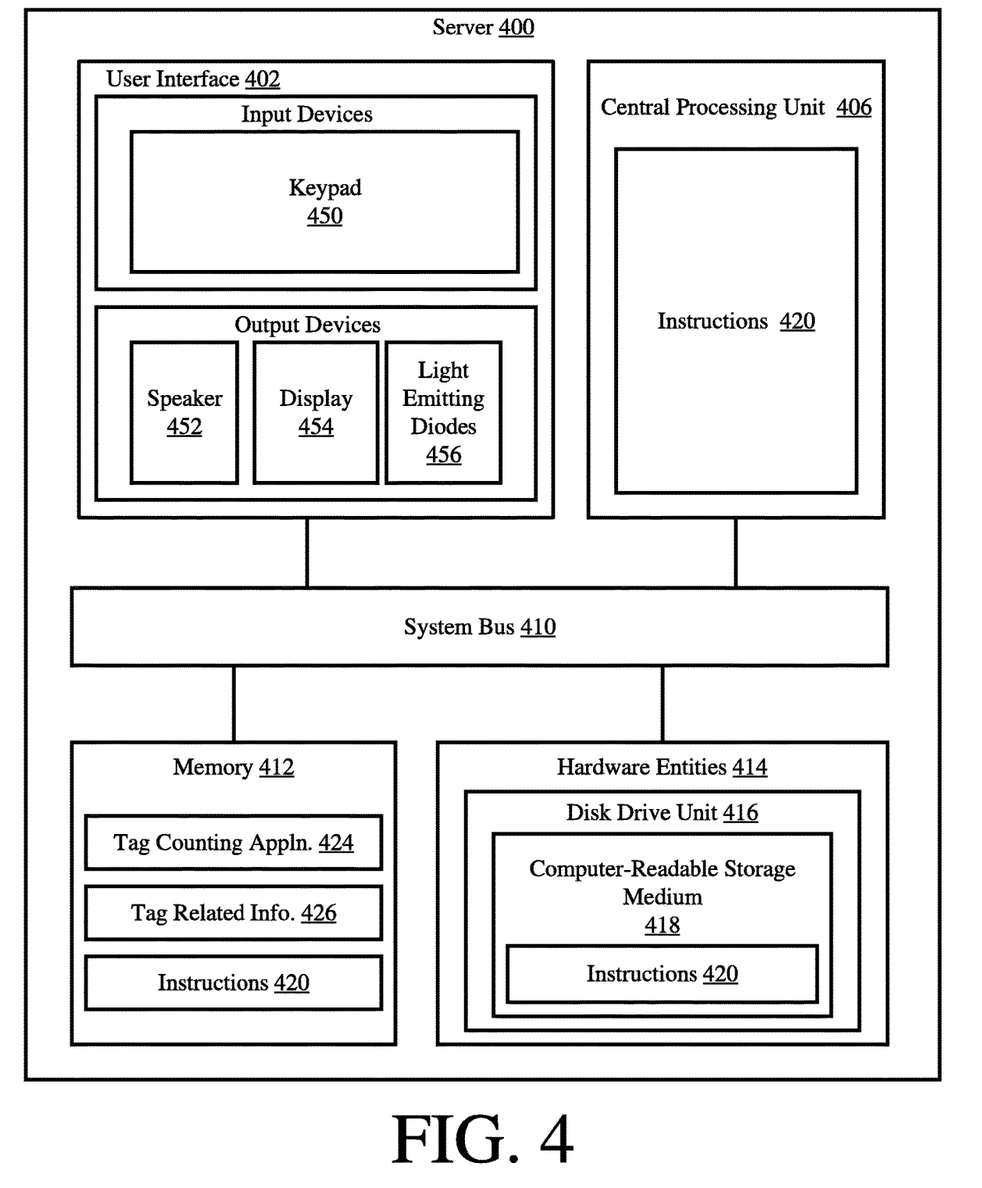
FIG. 4 is an illustration of an exemplary architecture for a sever.

Referring now to FIG. 4, there is provided a detailed block diagram of an exemplary architecture for a server 400. Server 210 of FIG. 2 is the same as or substantially similar to server 400. As such, the following discussion of server 400 is sufficient for understanding server 210.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate an improved cycle counting process for RFID tags (e.g., RFID tags 224 of FIG. 2). As such, the server 400 of FIG. 4 implements at least a portion of a method for counting RFID tags in accordance with the present solution. Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the server 400 comprises a user interface 402, a Central Processing Unit ("CPU") 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a Random Access Memory ("RAM"), a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the server 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the server 400 and that cause the server 400 to perform any one or more of the methodologies of the present disclosure.

In some scenarios, the hardware entities 314 include an electronic circuit (e.g., a processor) programmed for facilitating the provision of an improved inventory process. In this regard, it should be understood that the electronic circuit can access and run a tag counting application 424 installed on the server 400. The software application 424 is generally operative to facilitate the: reception of RFID tag information from remote RFID tag readers (e.g., handheld RFID tag readers $202_1, 202_2, \ldots, 202_N$); processing of received RFID tag information; adding new RFID tag information to a list of a master cycle count datastore (e.g., datastore 212 of FIG. 2); generation of timestamps for each RFID identifier's entry into the list of the master cycle count datastore; maintaining of a count of how many new RFID tags have been read by the handheld RFID tag readers; identification and ignoring of information associated with duplicate RFID tag reads by one or more RFID tag readers; logging of information indicating that duplicate reads of a given RFID tag has occurred; generation of a count value representing the number of RFID tag identifiers (e.g., EPC codes) inserted into the list of the master cycle count database; and/or communication of the count value and/or a cycle completion value to the handheld RFID tag readers. The cycle completion value can be computed as the number of records in a cycle count database relative to the total of expected number of records. Other functions of the software application 324 will become apparent as the discussion progresses.

Exemplary Methods for Counting RFID Tags in a Facility

Referring now to FIG. 5, there is provided a flow diagram of an exemplary method 500 for counting RFID tags (e.g., RFID tags 224 of FIG. 2) within a facility (e.g., RSF 220 of FIG. 2). Method 500 begins with 502 and continues with 504. In 504, a counting cycle is initiated. The counting cycle can be initiated in response to a user-software interaction with the RFID tag reader (e.g., handheld RFID tag reader $202_1, 202_2, \ldots, 202_N$ of FIG. 2) or the RFID tag reader's reception of a cycle start command sent from an external device (e.g., server 210 of FIG. 2).

In some scenarios, the system (e.g., system 200 of FIG. 2) provides a cycle resume option or a new cycle start option. If the cycle resume option is selected, then the RFID tag reader continues to use a local list (e.g., list $214_1, 214_2, \ldots, 214_N$ of FIG. 2 or list 318 of FIG. 3) which is at least partially filled with previous tag read entries during method 500. In contrast, if the new cycle start option is selected, then optional 506 is performed. In 506, at least a first portion of the local list is cleared. A second portion of the local list may include exclusion RFID tag information (e.g., EPCs for RFID tags that are not to be counted during the counting cycle). In this case, the second portion of the local list is not cleared.

Figure 5A:
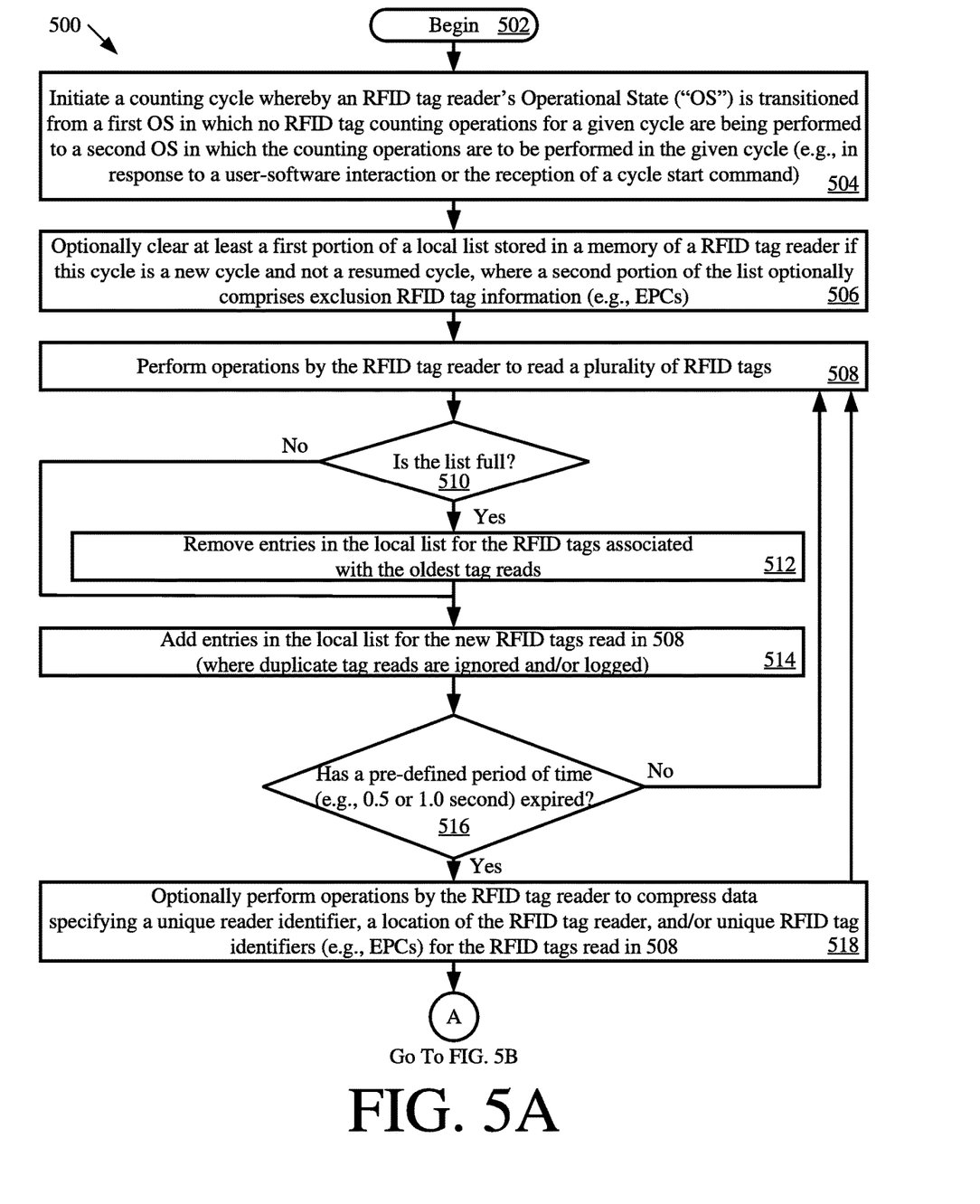
FIGS. 5A-5C (collectively referred to herein as "FIG. 5") provides a flow diagram of an exemplary method that is useful for understanding operations of a handheld RFID tag reader that are performed during an RFID tag counting cycle.

Next in 508, the RFID tag reader performs operations to read a plurality of RFID tags. The RFID tag reader also determines if the local list is full. If the local list is full [510:YES], then entries are removed therefrom for the RFID tags associated with the oldest tag reads. Thereafter, method 500 continues with 514 where entries are added to the list. If the local list is not full [510:NO], entries are added to the list in 514 for new RFID tags read in 508. Notably, duplicate tag reads are ignored and/or logged.

Upon completing 514, RFID tag read related information needs to sent to the server for purposes of synchronizing the local list with a remote list. This RFID tag read related information can be continuously sent (e.g., streamed) or periodically sent every so many seconds. In the latter case, the RFID tag reader performs a decision in 516. The decision is performed to determine if a pre-defined period of time (e.g., 0.5 or 1.0 seconds) has expired. If not [516:NO], then method 500 returns to 508 so that more RFID tags can be read. In contrast, if the pre-determined period of time has expired [516:YES], then optional 518 is performed where data is compressed prior to transmission to an external device. The data includes, but is not limited to, a unique reader identifier, a location of the RFID tag reader, and/or unique RFID tag identifiers (e.g., EPCs) for the RFID tag reads in 508. Upon completing 516 or 518, method 500 continues with 520 of FIG. 5B.

Figure 5B:
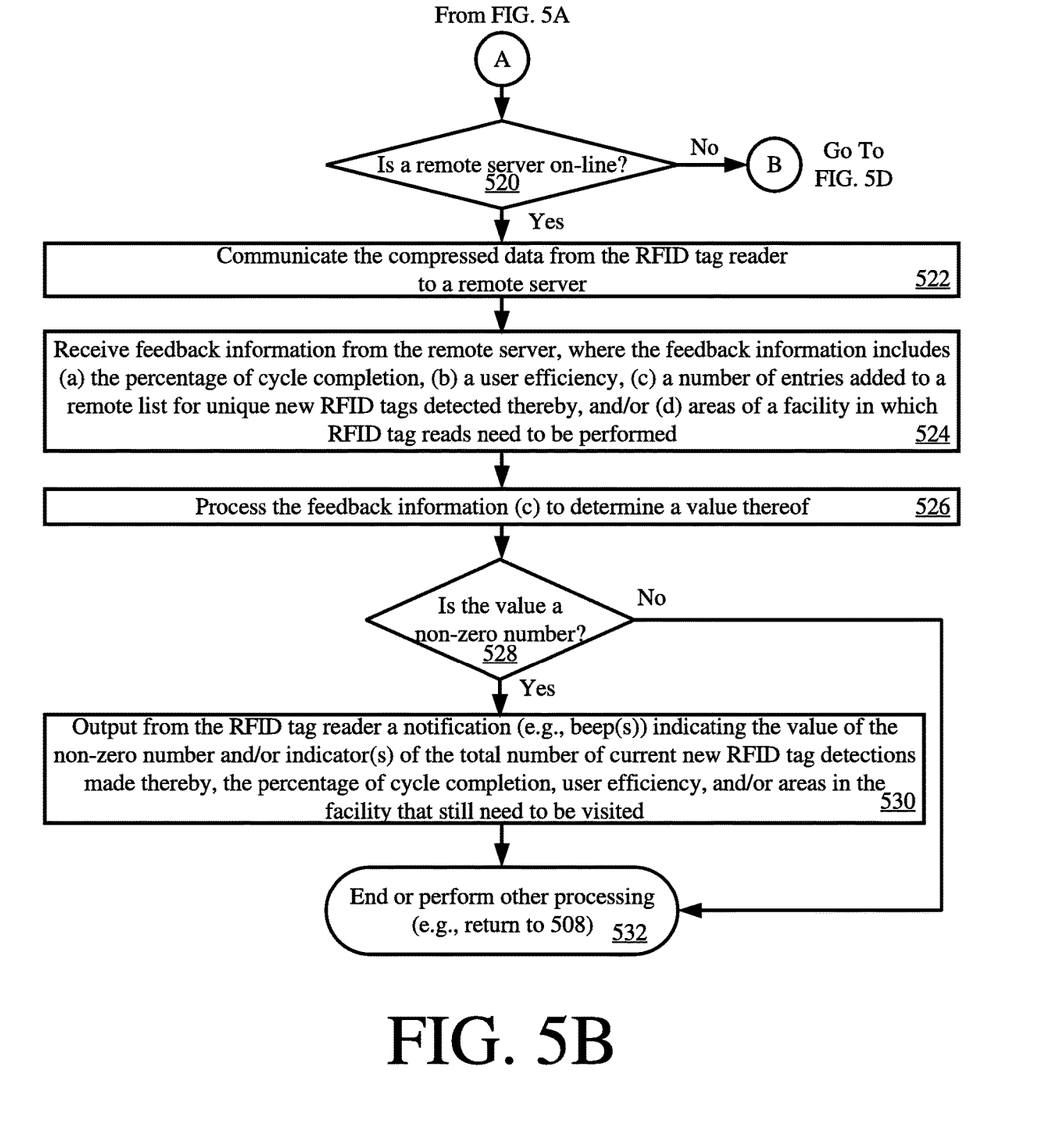

As shown in FIG. 5B, 520 involves determining if a sever (e.g., server 210 of FIG. 2) is on-line. If the server is on-line [520:YES], then 522 is performed where the compressed data is communicated from the RFID tag reader to the remote server. In turn, the RFID tag reader receives feedback information from the remote server, as shown by 524. The feedback information includes, but is not limited to, (a) the percentage of cycle completion, (b) a user efficiency, (c) a number of entries added to a remote list for unique new RFID tags detected thereby, and/or (d) areas of a facility in which RFID tag reads need to be performed. The feedback information is then processed in 526 to determine a value specified by portion (c). If this value is zero, then 532 is performed where method 500 ends or other processing is performed (e.g., return to 508).

In contrast, if the value is non-zero (e.g., ≥1), then feedback information is output to the user of the RFID tag reader. The output includes, but is not limited to, a notification indicating the value of the non-zero number and/or indicator(s) of the total number of current new RFID tag detections made thereby, the percentage of cycle completion, user efficiency, and/or areas in the facility that still need to be visited. Notably, the notification can change based on the value of the non-zero number. For example, the notification can include: at least one beep that has a variable volume and/or variable duration that correspondingly increase(s) and decrease(s) with changes in the value contained in feedback information received from the server; or the same number of beeps as the non-zero number. The present solution is not limited in this regard. Subsequently, 532 is performed where method 500 ends or other processing is performed (e.g., return to 508).

Figure 5C:
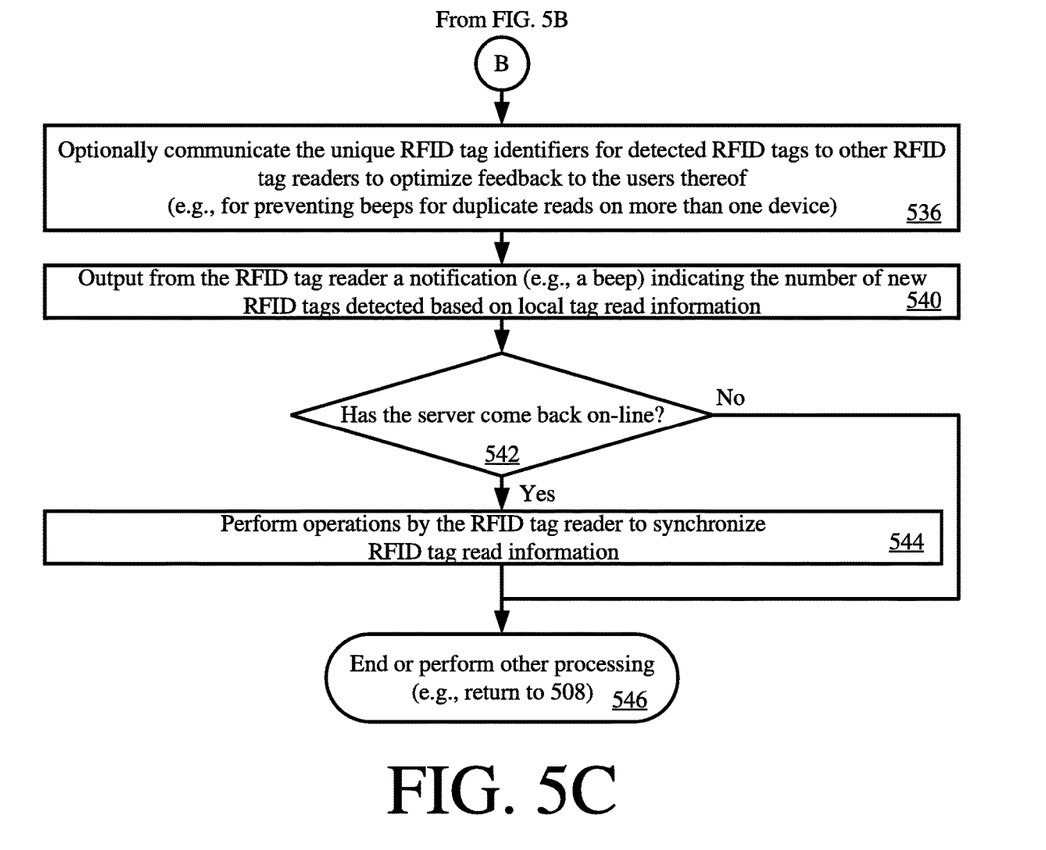

If the server is off-line [520:NO], then method 500 continues with optional 536 of FIG. 5C. As shown in FIG. 5C, 536 involves communicating the unique RFID tag identifiers for detected RFID tags to other RFID tag readers to optimize feedback to the users thereof (e.g., for preventing beeps for duplicate reads on more than one device). In next 540, a notification (e.g., a beep) is output from the RFID tag reader indicating the number of new RFID tags detected based on local tag read information. When the sever comes back on-line [542:YES], the RFID tag reader performs operations to synchronize RFID tag read information therewith, as shown by 544. Subsequently, method 500 ends or other processing is performed (e.g., return to 508).

Figure 6:
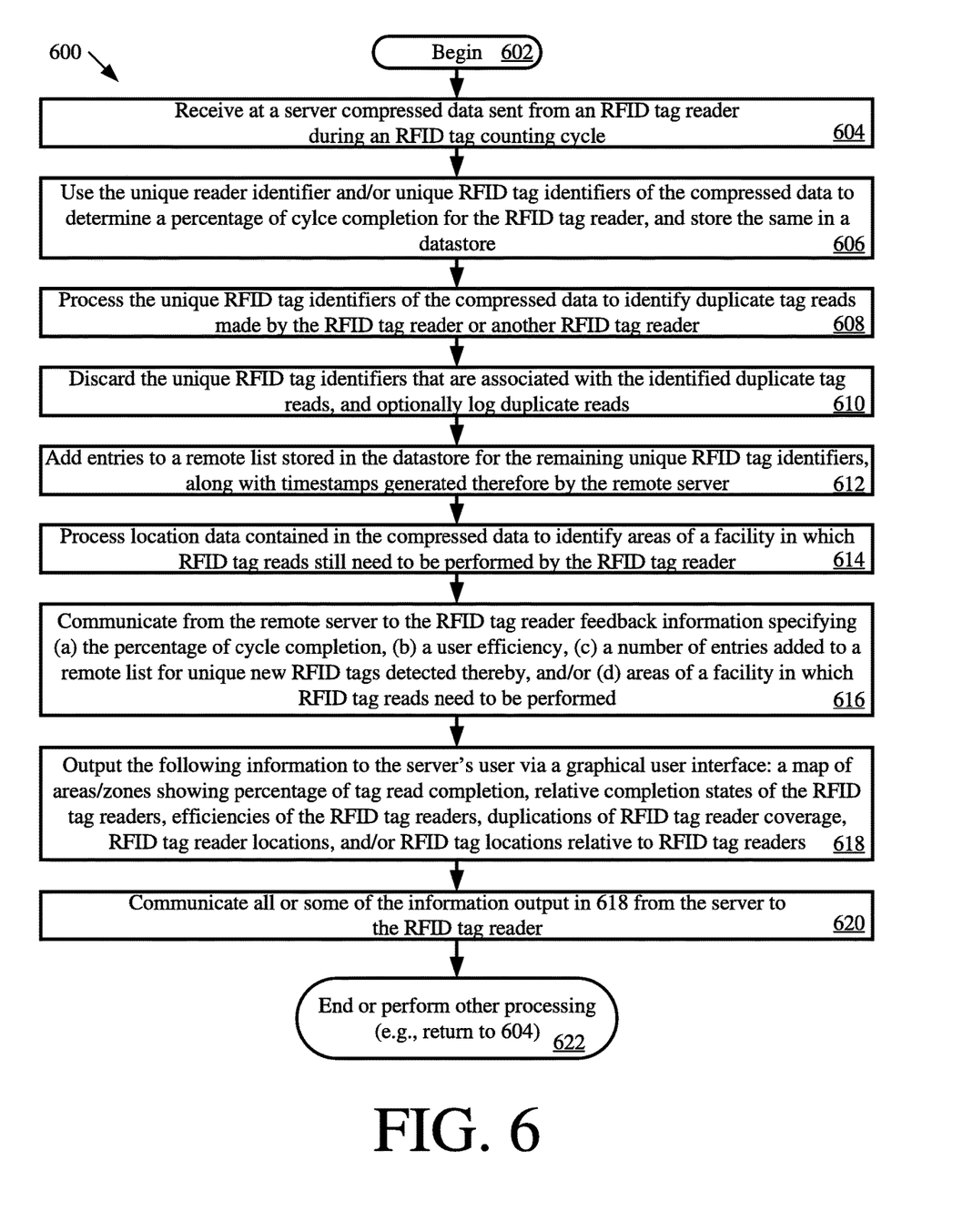
FIG. 6 provides a flow diagram of an exemplary method that is useful for understanding operations of a server that are performed during an RFID tag counting cycle.

Referring now to FIG. 6, there is provided a flow diagram of an exemplary method 600 that is useful for understanding operations of a server (e.g., server 210 of FIG. 2) that are performed during an RFID tag counting cycle. Method 600 begins with 602 and continues with 604 where compressed data is received at the server. The compressed data was sent from an RFID tag reader (e.g., handheld RFID reader $202_1$, $202_2$, . . . , or $202_N$ of FIG. 2). The compressed data includes, but is not limited to, data specifying a unique reader identifier, a location of an RFID tag reader, and/or unique RFID tag identifiers (e.g., EPCs) for the RFID tags read by the RFID tag reader.

At the server, the unique reader identifier and/or unique RFID tag identifiers of the compressed data are used in 606 to determine a percentage of cycle completion for the RFID tag reader. The determined percentage is stored in a datastore (e.g., datastore 212 of FIG. 2). The server also processes the unique RFID tag identifiers in 608 to identify duplicate tag reads made by the RFID tag reader or another RFID tag reader. The server than discards the unique RFID tag identifiers that are associated with the identified duplicate tag reads, as shown by 610. The duplicate tag reads can also be logged. In 612, entries for the remaining RFID tag identifiers are then added to a remote list stored in the datastore. Timestamps for the entries are generated by the server and respectively stored along with the entries. The server further processes the location data in 614 to identify areas of a facility in which RFID tag reads still need to be performed by the RFID tag reader. Upon completing 614, the server communicates feedback information to the RFID tag reader as shown by 616. The feedback information comprises information specifying (a) the percentage of cycle completion, (b) a user efficiency, (c) a number of entries added to a remote list for unique new RFID tags detected thereby, and/or (d) areas of a facility in which RFID tag reads need to be performed.

In some scenarios, the server also performs other data analytics and provides results of the data analytics to a user thereof via a graphical user interface (e.g., a dashboard), as shown by 618. This information can include, but is not limited to, a map of areas/zones showing the percentage of tag read completion by one or more RFID tag readers, relative completion states of the RFID tag readers, efficiencies of the RFID tag readers, duplications of RFID tag reader coverage, RFID tag reader locations, and/or RFID tag locations relative to locations of RFID tag readers. All or a portion of this information may be communicated to the RFID tag reader in 620. Subsequently, method 600 ends or other processing is performed.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for operating a tag reader, comprising:
performing tag read operations by the tag reader to read tags;
processing first information received from the read tags to identify which tags are newly detected tags;
adding entries for the newly detected tags in a local list stored in a local memory of the tag reader;
communicating second information at least identifying the newly detected tags from the tag reader to a remote computing device;
receiving, by the tag reader, feedback information generated by the remote computing device which specifies at least (1) a count of entries added to a remote list stored in a remote datastore based on the second information and (2) a percentage of cycle completion,
where the entries are for given ones of the newly detected tags which were not already identified in the remote list, and the remote list identifies tags which were detected by at least one other tag reader; and
selectively outputting a notification from the tag reader based on the value of the count, which is less than a total number of the newly detected tags.

2. The method according to claim 1, wherein the second information is communicated from the tag reader continuously or at every pre-defined interval of time.

3. The method according to claim 1, wherein the entries are added to the remote list based additionally on third information obtained from at least one other tag reader.

4. The method according to claim 1, further comprising performing operations by the tag reader to clear at least a first portion of the local list prior to when the tag read operations are performed by the tag reader.

5. The method according to claim 4, wherein a second portion of the local list includes exclusion information identifying tags that are not to be counted during a tag counting cycle.

6. The method according to claim 1, further comprising removing an entry from the local list for at least one tag associated with an oldest tag read.

7. The method according to claim 1, wherein the second information further specifies at least one of a unique reader identifier and a location of the tag reader.

8. The method according to claim 1, wherein the feedback information further specifies at least one of a user efficiency and an area of a facility in which tag reads still need to be performed.

9. The method according to claim 1, wherein the notification is selectively output from the tag reader only when the value is a non-zero value.

10. The method according to claim 1, wherein the notification comprises: at least one beep having a variable volume or variable duration that correspondingly increases and decreases with changes in the value; or a plurality of beeps of a number defined by the value.

11. A tag reader, comprising:
a processor;
and a non-transitory computer-readable storage medium comprising programming instructions that are configured to cause the processor to implement a method for inventory management,
wherein the programming instructions comprise instructions to:
process first information received from tags read by the tag reader to identify which tags are newly detected tags;
add entries for the newly detected tags in a local list stored at the tag reader;
cause second information at least identifying the newly detected tags to be communicated from the tag reader to a remote computing device;
receive feedback information generated by the remote computing device which specifies at least (1) a count of entries added to a remote list stored in a remote datastore based on the second information and (2) a percentage of cycle completion,
where the entries are for given ones of the newly detected tags which were not already identified in the remote list, and the remote list identifies tags which were detected by at least one other tag reader; and
cause a notification to be selectively output from the tag reader based on the value of the count, which is less than a total number of the newly detected tags.

12. The tag reader according to claim 11, wherein the second information is communicated from the tag reader continuously or at every pre-defined interval of time.

13. The tag reader according to claim 11, wherein the entries are added to the remote list based additionally on third information obtained from at least one other tag reader.

14. The tag reader according to claim 11, wherein the programming instructions further comprise instructions to clear at least a first portion of the local list prior to when the tag read operations are performed by the tag reader.

15. The tag reader according to claim 14, wherein a second portion of the local list includes exclusion information identifying tags that are not to be counted during a tag counting cycle.

16. The tag reader according to claim 11, wherein the programming instructions further comprise instructions to remove an entry from the local list for at least one tag associated with an oldest tag read.

17. The tag reader according to claim 11, wherein the second information further specifies at least one of a unique reader identifier and a location of the tag reader.

18. The tag reader according to claim 11, wherein the feedback information further specifies at least one of a user efficiency and an area of a facility in which tag reads still need to be performed.

19. The tag reader according to claim 11, wherein the notification is selectively output from the tag reader only when the value is a non-zero value.

20. The tag reader according to claim 11, wherein the notification comprises: at least one beep having a variable volume or variable duration that correspondingly increases and decreases with changes in the value; or a plurality of beeps of a number defined by the value.

* * * * *